United States Patent [19]

Nohira et al.

[11] 4,318,273
[45] Mar. 9, 1982

[54] INTERNAL COMBUSTION ENGINE EQUIPPED WITH A TURBOCHARGER

[75] Inventors: Hidetaka Nohira; Kunimasa Yoshimura, both of Mishima; Mitsuyuki Ugajin, Susono, all of Japan

[73] Assignee: Toyota Jidosha Kogyo Kabushiki Kaisha, Toyota, Japan

[21] Appl. No.: 74,527

[22] Filed: Sep. 11, 1979

[30] Foreign Application Priority Data

Jul. 2, 1979 [JP] Japan .................. 54-82568

[51] Int. Cl.³ ............................................. F02B 37/00
[52] U.S. Cl. ...................................... 60/611; 123/308; 123/442
[58] Field of Search ................. 60/611; 123/308, 336, 123/432, 442, 564

[56] References Cited

U.S. PATENT DOCUMENTS

| | | | |
|---|---|---|---|
| 3,087,480 | 4/1963 | Baudry | 123/432 |
| 3,673,798 | 7/1972 | Kuehl | 60/605 |
| 4,232,640 | 11/1980 | Matsumoto et al. | 123/336 X |
| 4,241,712 | 12/1980 | Matsumoto | 123/432 |

FOREIGN PATENT DOCUMENTS 889376 9/1953 Fed. Rep. of Germany ...... 123/564
242697 11/1946 Switzerland ........................ 123/564

Primary Examiner—Michael Koczo, Jr.
Attorney, Agent, or Firm—Stevens, Davis, Miller & Mosher

[57] ABSTRACT

An internal combustion engine comprising an intake duct and a turbocharger arranged in the intake duct. A primary throttle valve connected to the accelerator pedal is arranged in the intake duct located downstream of the turbocharger. A secondary throttle valve is arranged in the intake duct located downstream of the primary throttle valve. An auxiliary intake passage is branched off from the intake duct located between the primary and the secondary throttle valves and is connected to the intake passage located downstream of the secondary throttle valve. The secondary throttle valve is gradually closed from the full open position as the level of the vacuum or the positive pressure, which are produced in the intake duct located between the primary and the secondary throttle valves, is increased.

18 Claims, 8 Drawing Figures

INTERNAL COMBUSTION ENGINE EQUIPPED WITH A TURBOCHARGER

DESCRIPTION OF THE INVENTION

The present invention relates to an intake system of an internal combustion engine equipped with a turbocharger.

A turbocharger is used for increasing the output power of an engine in such a way that the exhaust gas provides the rotating force of the turbocharger to increase the pressure of the sucked air fed into the cylinder of the engine. However, in an internal combustion engine equipped with such a turbocharger, since the temperature of the sucked air is significantly increased due to the compressing operation of the compressor of the turbocharger when the engine is operating under a heavy load, the temperature of the end gas in the combustion chamber becomes high and, as a result, a problem of knocking occurs. Contrary to this, when the same engine is operating under a light load, the increasing of the pressure of the sucked air by the compressor of the turbocharger is not carried out. Consequently, at this time, the operating condition of the engine is the same as that of an ordinary engine equipped with no turbocharger. Therefore, even if the engine is equipped with a turbocharger, since a satisfactory turbulence of the mixture is not created in the combustion chamber when the engine is operating under a light load, it is impossible to greatly increase the burning velocity and, as a result, a problem occurs in that it is difficult to ensure a stable combustion.

An object of the present invention is to provide an internal combustion engine equipped with a turbocharger, which is capable of greatly increasing the burning velocity when the engine is operating under a light load, while preventing the occurrence of knocking when the engine is operating under a heavy load.

According to the present invention, there is provided an internal combustion engine having a combustion chamber and an intake valve, said engine comprising: an intake passage communicating the combustion chamber with the atmosphere; an exhaust passage communicating the combustion chamber with the atmosphere; a turbocharger comprising a compressor arranged in said intake passage, and a turbine arranged in said exhaust passage; fuel supply means for forming an air-fuel mixture fed into the combustion chamber; primary valve means arranged in said intake passage and opened in accordance with an increase in the level of the load of the engine; secondary valve means arranged in said intake passage at a position located downstream of said primary valve means and said compressor; an auxiliary intake passage having an inlet and an outlet which is connected to said intake passage located downstream of said secondary valve means, said inlet being connected to a portion of said intake passage which is located upstream of said secondary valve means and downstream of said primary valve means and said compressor, and; means for actuating said secondary valve means in response to changes in vacuum and positive pressure produced in said portion of said intake passage, to gradually close said secondary valve means from the full open position in accordance with an increase in the level of said vacuum or said positive pressure.

The present invention may be more fully understood from the description of preferred embodiments of the invention set forth below, together with the accompanying drawings.

DESCRIPTION OF PREFERRED EMBODIMENTS

Figure 1:
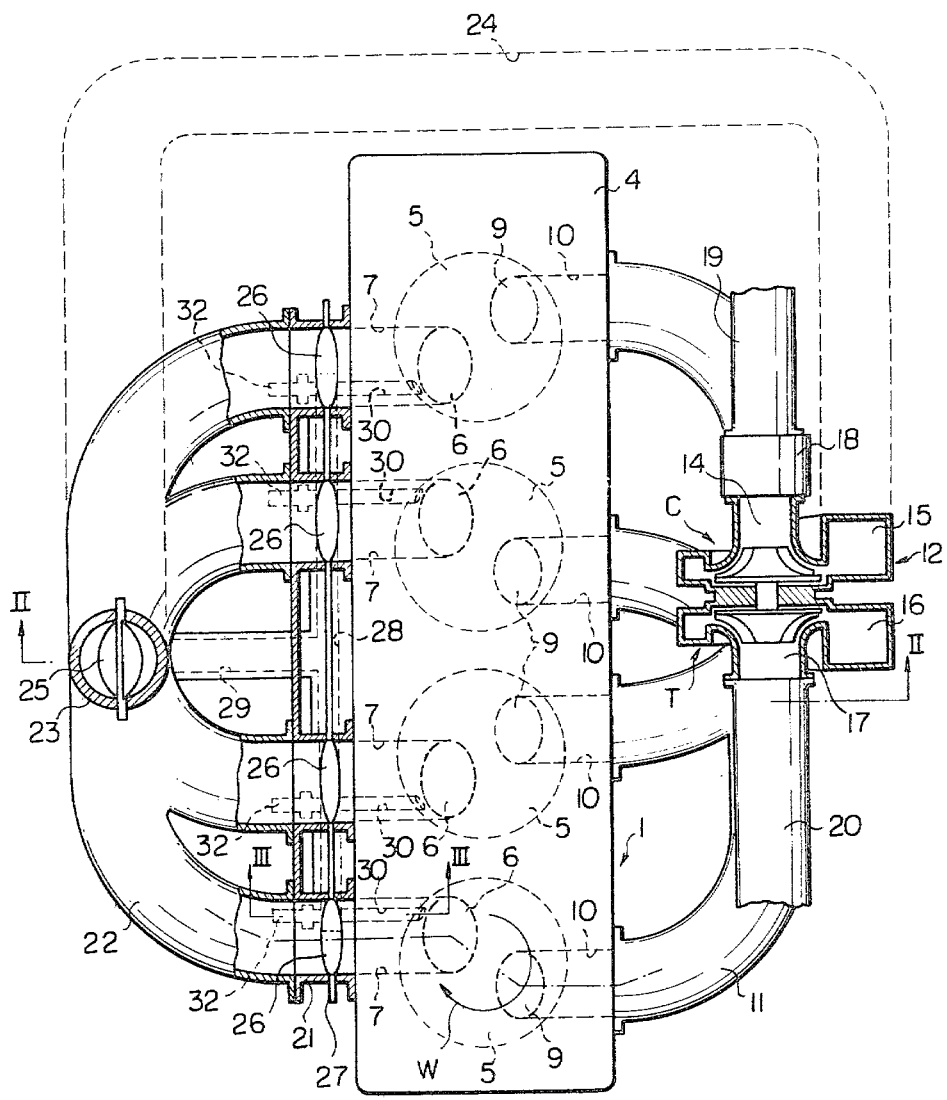
FIG. 1 is a plan view, partly in cross-section, of an embodiment of an internal combustion engine according to the present invention.
Figure 2:
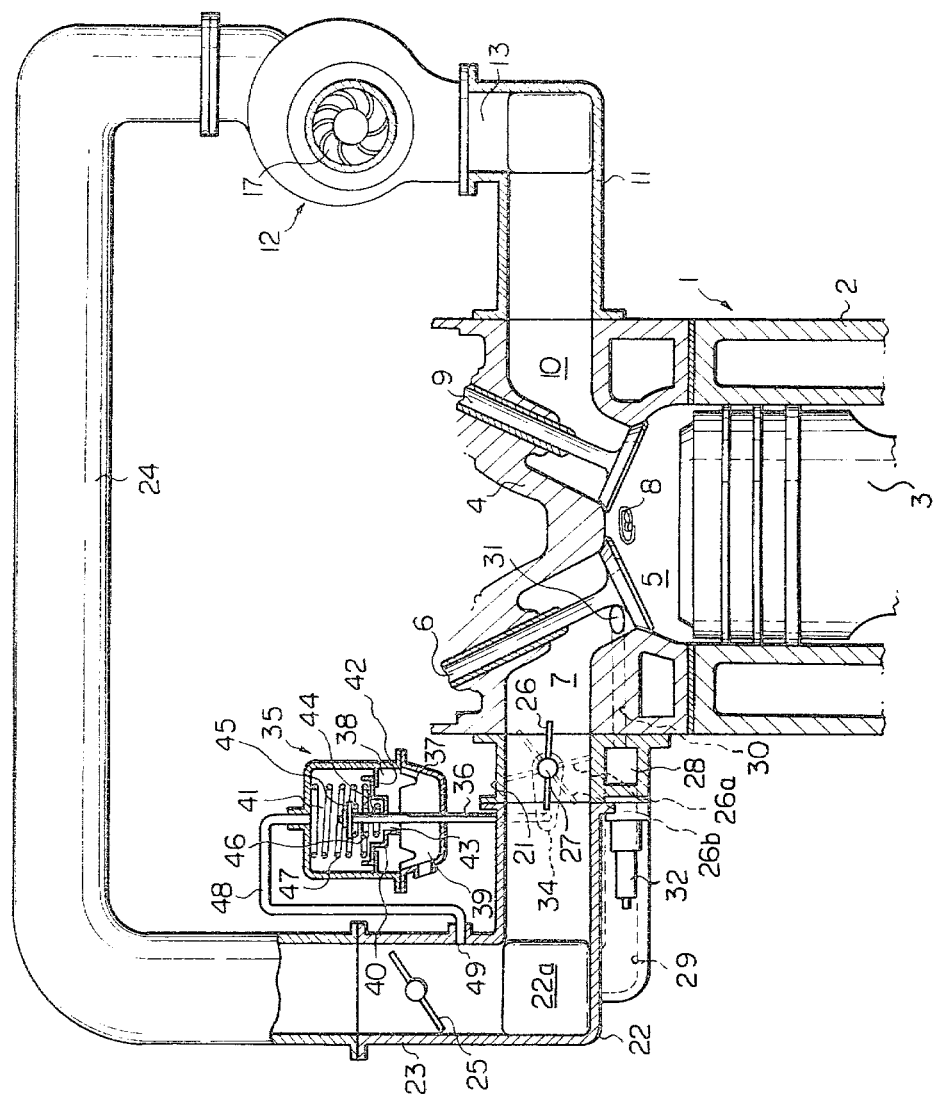
FIG. 2 is a cross-sectional side view taken along the line II—II in FIG. 1.

Referring to FIGS. 1 and 2, 1 designates an engine body, 2 a cylinder block, 3 a piston reciprocally movable in the cylinder block 2 and 4 a cylinder head fixed onto the cylinder block 2; 5 designates combustion chambers formed between the pistons 3 and the cylinder head 4, 6 intake valves, 7 intake ports, and 8 a spark plug; 9 designates exhaust valves, 10 exhaust ports, 11 an exhaust manifold connected to the exhaust ports 10 and 12 a turbocharger mounted on an exhaust manifold outlet 13. As illustrated in FIG. 1, the turbocharger 12 comprises a compressor C and a turbine T. The compressor C has an air suction port 14 and an air discharge port 15, and the turbine T has an exhaust gas inflow chamber 16 and an exhaust gas discharge port 17. The air suction port 14 is connected to the air cleaner (not shown) via an air flow meter 18 and an intake duct 19. The exhaust gas inflow chamber 16 of the turbine T is connected to the exhaust manifold outlet 13, and the exhaust gas discharge port 17 is connected to the atmosphere via an exhaust pipe 20.

Figure 3:
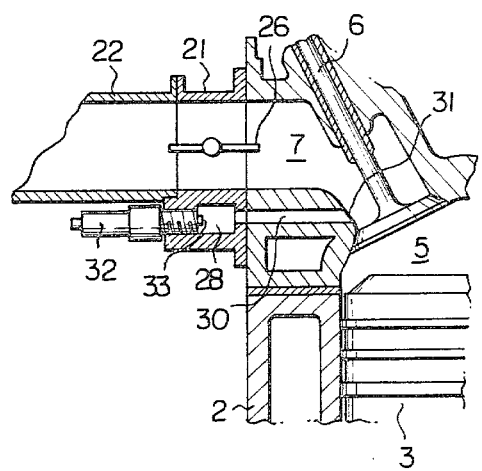
FIG. 3 is a cross-sectional side view taken along the line III—III in FIG. 1.

As illustrated in FIGS. 1 and 2, an intake manifold 22 is fixed onto the cylinder head 4 via a spacer 21, and an inlet duct 23 of the intake manifold 22 is connected to the air discharge chamber 15 of the compressor C via an intake duct 24. A primary throttle valve 25 is arranged in the inlet duct 23 of the intake manifold 22 and connected to the accelerator pedal (not shown) arranged in the driver's compartment (not shown). Secondary throttle valves 26 are arranged in the spacer 21 and connected to a common throttle shaft 27. From FIG. 1, it will be understood that the secondary throttle valve 26 is provided for each cylinder. A distribution channel 28, extending in the longitudinal direction of the engine body 1 and having a cross-sectional area which is smaller than that of the intake ports 7, is formed in the spacer 21 beneath the secondary throttle valves 26, and the central portion of the distribution channel 28 is connected to a collecting portion 22a of the intake manifold 22 via an auxiliary intake passage 29. Four channel branches 30, each communicating the distribution channel 28 with the corresponding intake port 7, are formed in the cylinder head 4 and arranged so that the opening 31 of each of the channel branches 30 is located on the inner wall of the corresponding intake port 7 at a position near the rear face of the valve head of the corresponding intake shown valve 6. In addition, the opening 31 of each of the channel branches 30 is directed towards a valve gap formed between the corresponding intake valve 6 and its valve seat when the intake valve 6 is opened and, in addition, the opening 31 is directed tangentially to the circumferential wall of the combustion chamber 5. As illustrated in FIGS. 1 and 2, a fuel injector 32 is provided for each cylinder, and the fuel injectors 32 are arranged in the spacer 21. As illustrated in FIG. 3, the fuel nozzle 33 of each of the fuel injectors 32 is arranged to face the open end of the corresponding channel branch 30, so that the fuel is injected into the channel branch 30 from the fuel injector 32.

Turning to FIG. 2, an arm 34 is fixed onto the common throttle shaft 27 and a control rod 36 of a secondary throttle valve drive apparatus 35 is connected to the tip of the arm 34. The secondary throttle valve drive apparatus 35 comprises a control pressure chamber 38 and an atmospheric pressure chamber 39, which are separated by a diaphragm 37, and the control rod 36 is fixed onto the lower wall of the diaphragm 37. A movable spring retainer 40 is arranged above the diaphragm 37 and a pressure introducing chamber 41 is formed above the movable spring retainer 40. In addition, an annular stop 42, capable of abutting against the movable spring retainer 40, is formed on the inner wall of the housing of the secondary throttle valve drive apparatus 35. An aperture 43 is formed on the central portion of the movable spring retainer 40, and a rod 44, passing through the aperture 43 and projecting into the pressure introducing chamber 41, is fixed onto the upper wall of the diaphragm 37. Another spring retainer 45 is fixed onto the tip of the rod 44, and a compression spring 46 is inserted between the spring retainer 45 and the movable spring retainer 40. In addition, another compression spring 47 is inserted between the movable spring retainer 40 and the inner wall of the pressure introducing chamber 41. The control pressure chamber 38 and the pressure introducing chamber 41 are interconnected to each other via the aperture and, thus, the pressure in the control pressure chamber 38 is always maintained at a level which is the same as that of the pressure in the pressure introducing chamber 41. The pressure introducing chamber 41 is connected via a conduit 48 to a control pressure port 49, which opens into the inlet duct 23 located downstream of the primary throttle valve 25.

Figure 4:
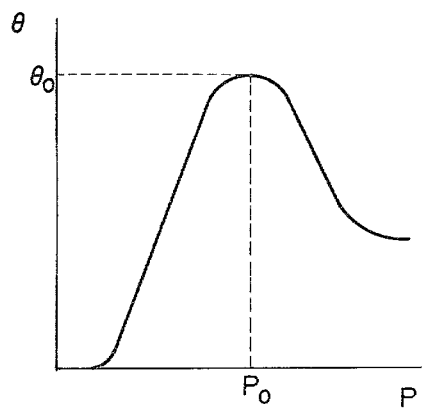
FIG. 4 is a graph showing the relationship between the opening degree of the secondary throttle valves and the pressure acting on the control pressure port.

FIG. 4 shows the relationship between the opening degree of the secondary throttle valves 26 and the pressure acting on the control pressure port 49. In FIG. 4, the ordinate $\theta$ indicates the opening degree of the secondary throttle valves 26 and the abscissa P indicates the pressure acting on the control pressure port 49. In addition, in FIG. 4, $\theta_0$ in the ordinate $\theta$ indicates full open, and $P_0$ in the abscissa P indicates the atmospheric pressure. FIG. 2 illustrates the case wherein the atmospheric pressure acts on the control pressure port 49 and, thus, the pressure in the control pressure chamber 38 is equal to the atmospheric pressure. At this time, as illustrated in FIG. 2, the movable spring retainer 40 abuts against the annular stop 42, due to the spring force of the compression spring 47, and the diaphragm 37 abuts against the lower end of the movable spring retainer 40, due to the spring force of the compression spring 46. As a result of this, the secondary throttle valves 26 remain fully opened as illustrated by the solid line in FIG. 2.

In the case where a vacuum acts on the control pressure port 49, the diaphragm 37 moves upwards together with the movable spring retainer 40 against the spring force of the compression spring 47, and as a result, the secondary throttle valves 26 is rotated in the clockwise direction. Thus, as illustrated in FIG. 4, the opening degree $\theta$ of the secondary throttle valves 26 is reduced as the level P of the vacuum acting on the control pressure port 49 is increased. In addition, when the level P of the vacuum acting on the control pressure port 49 is increased to a further extent, the secondary throttle valves 26 are completely closed as illustrated by the broken line 26a in FIG. 2.

In the case where the positive pressure acts on the control pressure port 49, the diaphragm 37 moves downwards against the spring force of the compression spring 46, and as a result, the secondary throttle valves 26 are rotated in the counter-clockwise direction. Thus, as illustrated in FIG. 4, the opening degree $\theta$ of the secondary throttle valves 26 is reduced as the positive pressure P acting on the control pressure port 29 is increased. In addition, when the positive pressure P acting on the control pressure port 29 is increased above a predetermined level, the secondary throttle valves 26 are maintained at a certain open degree as illustrated by the broken line 26b in FIG. 2.

In operation, when the opening degree of the primary throttle valve 25 is small and, thus, the engine is operating under a light load, since the increasing of the pressure of the sucked air by the compressor C of the turbocharger 12 is not carried out, the inside of the intake duct 24 is maintained at approximately atmospheric pressure, and in addition, a large vacuum is produced in the intake manifold 22 located downstream of the primary throttle valve 25. Consequently, at this time, since the large vacuum acts on the control pressure port 49, the diaphragm 37 moves upwards, and as a result, the secondary throttle valves 26 remain completely closed, as illustrated by the broken line 26a in FIG. 2, as mentioned above. At this time, the sucked air introduced into the intake manifold 22 via the intake duct 24 is spouted via the auxiliary intake passage 29, the distribution channel 28 and one of the channel branches 30 into the intake port 7 of the cylinder which is in the intake stroke. In addition, at this time, since the fuel is injected into the channel branch 30 from the fuel injector 32 of the cylinder which is in the intake stroke, and since the channel branch 30 has a cross-sectional area which is much smaller than that of the intake port 7, the sucked air and the fuel, that is, the mixture is spouted from the channel branch 30 into the intake port 7 of the cylinder which is in the intake stroke at a high speed. As mentioned above, since the opening 31 of each of the channel branches 30 is directed towards the valve gaps formed between the corresponding intake valve 6 and its valve seat when the intake valve 6 is opened, and since the opening 31 is directed tangentially to the circumferential inner wall of the combustion chamber 5, the mixture spouted from the channel branch 30 into the intake port 7 of the cylinder which is in the intake stroke flows into the combustion chamber 5 via the above-mentioned valve gap. As a result of this, a strong swirl motion, as illustrated by the arrow W in FIG. 1, is caused in the combustion chamber 5 and, thus, the burning velocity is greatly increased when the engine is operating under a light load.

As the opening degree of the primary throttle valve 25 is gradually increased, the level of the vacuum acting on the control pressure port 49 is gradually reduced. In addition, from FIG. 4, it will be understood that, as the level P of the vacuum is gradually reduced, the opening degree of the secondary throttle valves 26 is gradually increased. In FIG. 2, when the secondary throttle valves 26 are opened to some extent, a part of the sucked air introduced into the intake manifold 22 via the intake duct 24 flows into the combustion chambers 5 via the manifold branches of the intake manifold 22 and the intake ports 7, and the remaining part of the sucked air is fed into the combustion chambers 5 via the auxiliary intake passage 29, the distribution channel 28 and the channel branches 30.

When the primary throttle valve 25 is opened to a further extent and, thus, the pressure acting on the control pressure port 49 becomes approximately equal to the atmospheric pressure, the secondary throttle valves 26 are fully opened, as illustrated by the solid line in FIG. 2. At this time, a large part of the sucked air is fed into the combustion chambers 5 via the manifold branches of the intake manifold 22 and the intake ports 7. In addition, at this time, the fuel is fed via the channel branches 30 from the fuel injectors 32 into the sucked air flowing within the intake ports 7.

When the engine is operating under a heavy load, the rotation speed of the turbocharger 12 is increased. As a result of this, since the pressure of the sucked air is increased by the compressing operation of the compressor C, a positive pressure is produced in the intake duct 24, and this positive pressure acts on the control pressure port 49. At this time, since the diaphragm 37 moves downwards as mentioned previously, the secondary throttle valves 26 are maintained at a certain open degree, as illustrated by the broken line 26b in FIG. 2. Consequently, at this time, a part of the sucked air introduced into the intake manifold 22 via the intake duct 24 flows into the combustion chambers 5 via the auxiliary intake passage 29, the distribution channel 28 and the channel branches 30, and causes a strong swirl motion in the combustion chamber 5. As mentioned above, when the engine is operating under a heavy load, a strong swirl motion is created in the combustion chambers 5. As a result of this, the flame of the mixture ignited by the spark plug 8 rapidly spreads within the combustion chambers 5 and, thus, knocking is prevented from occurring.

Figure 5:
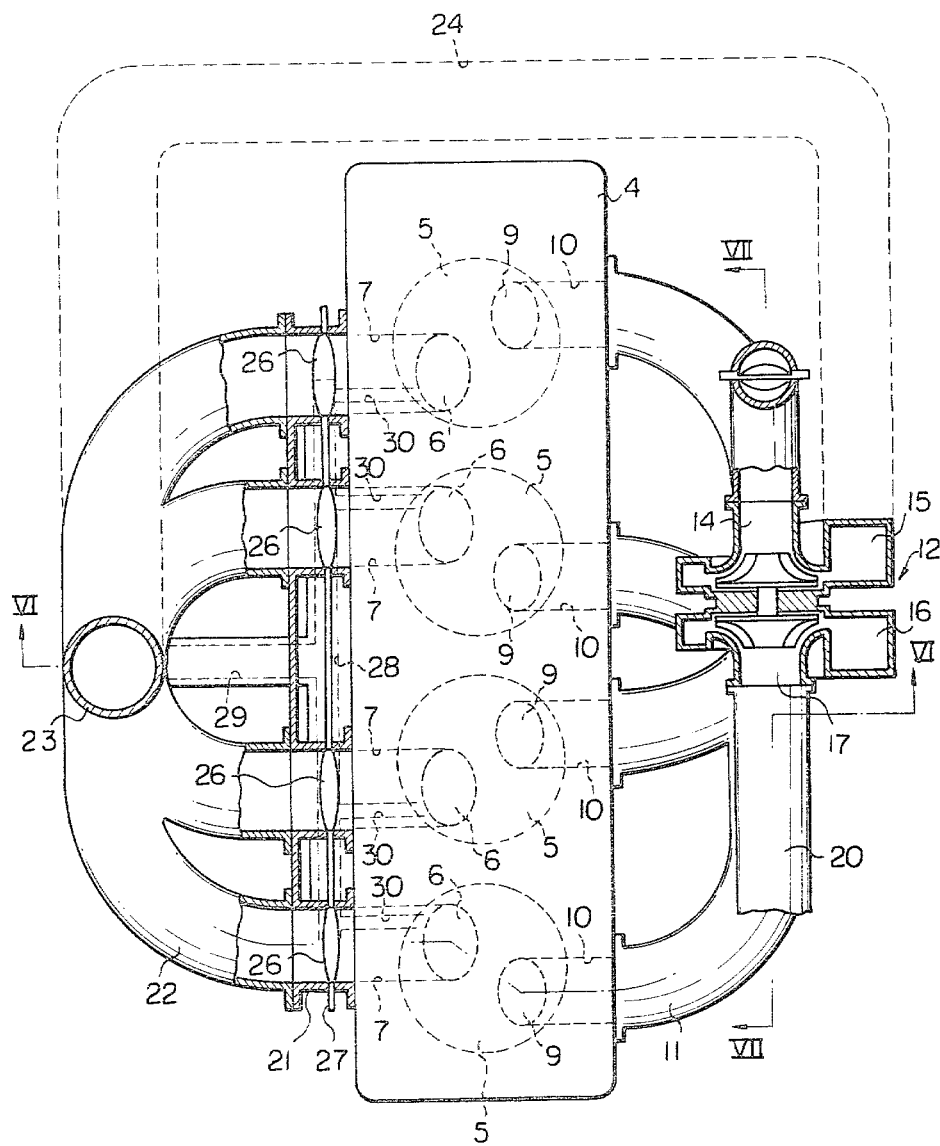
FIG. 5 is a plan view, partly in cross-section, of another embodiment according to the present invention.
Figure 6:
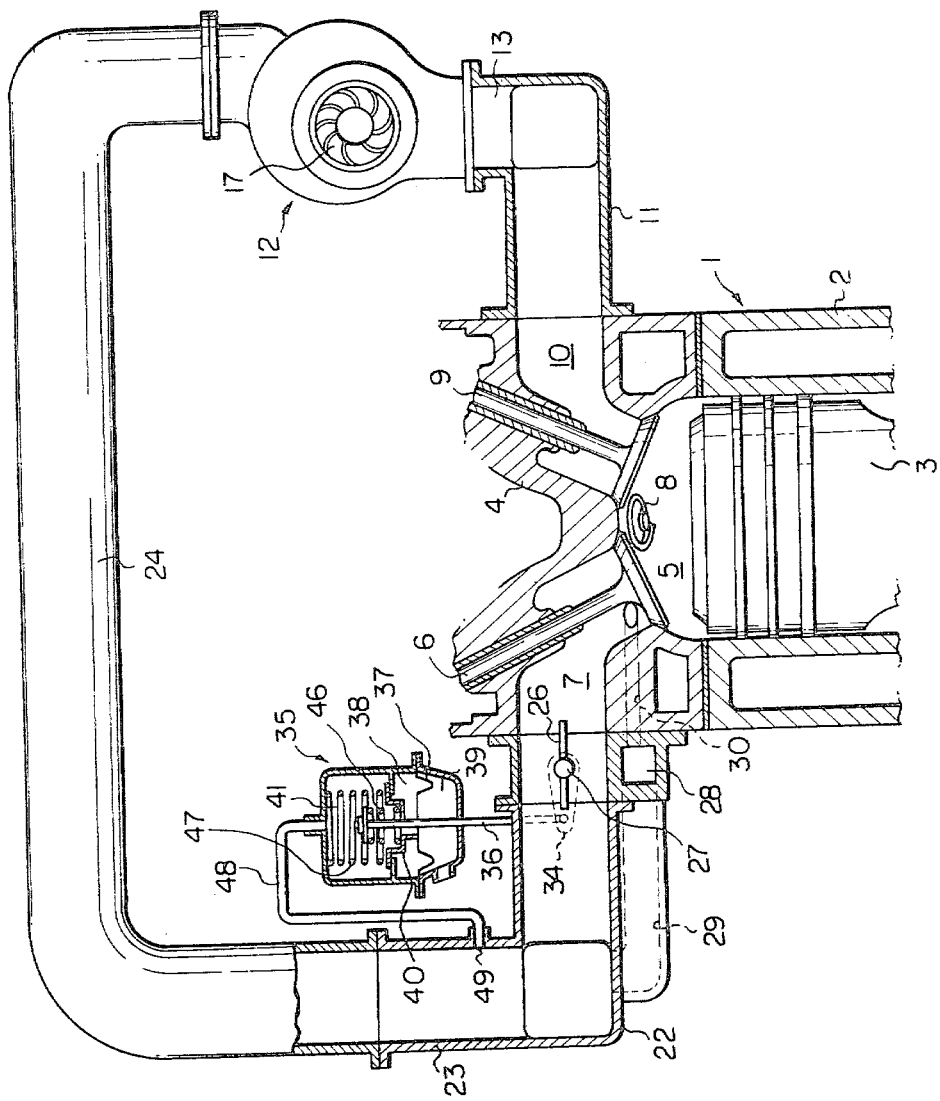
FIG. 6 is a cross-sectional side view taken along the line VI—VI in FIG. 5.
Figure 7:
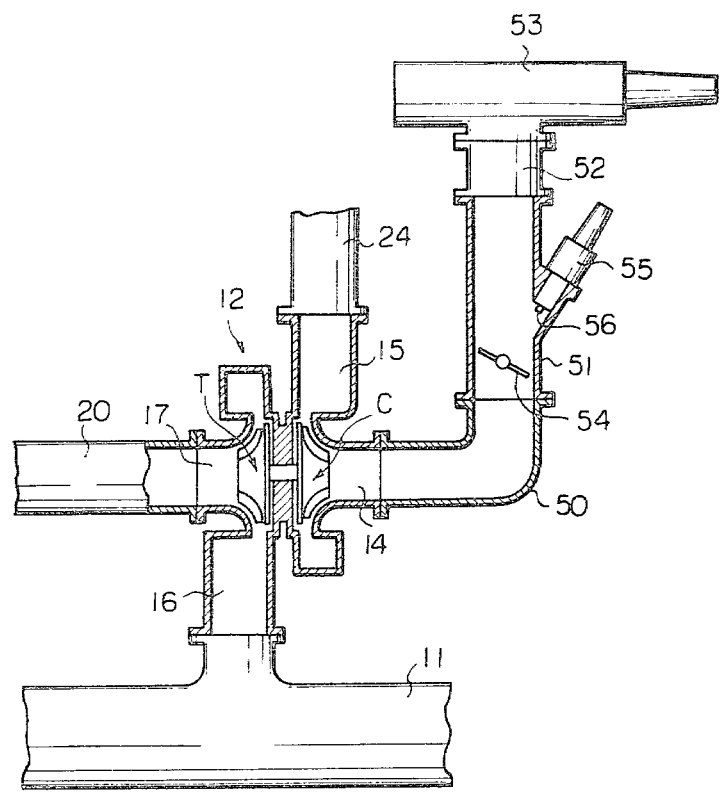
FIG. 7 is a cross-sectional side view taken along the line VII—VII in FIG. 5.

FIGS. 5 through 7 illustrate another embodiment according to the present invention. In FIGS. 5 through 7, similar components are indicated with the same reference numerals used in FIGS. 1 through 3. In this embodiment, the air suction port 14 of the compressor C, of the turbocharger 12, is connected to an air cleaner 53 via intake ducts 50, 51 and an air flow meter 52, and a primary throttle valve 54 connected to the accelerator pedal (not shown) and a fuel injector 55 are arranged in the intake duct 51. In addition, as illustrated in FIG. 7, the fuel injector 55 is arranged in the intake duct 51 at a position located upstream of the primary throttle valve 55, and the fuel nozzle 56 of the fuel injector 55 is directed towards the front face of the primary throttle valve 54. In this embodiment, since the fuel injected from the fuel injector 55 impinges upon the front face of the primary throttle valve 54, the vaporization of the fuel is promoted. In addition, the vaporization of the fuel is further promoted when the fuel passes through the compressor C. As mentioned above, in this embodiment, it is possible to reduce the temperature of the sucked air fed into the cylinders by promoting the vaporization of the fuel and, as a result, it is possible to suppress the occurrence of knocking.

Figure 8:
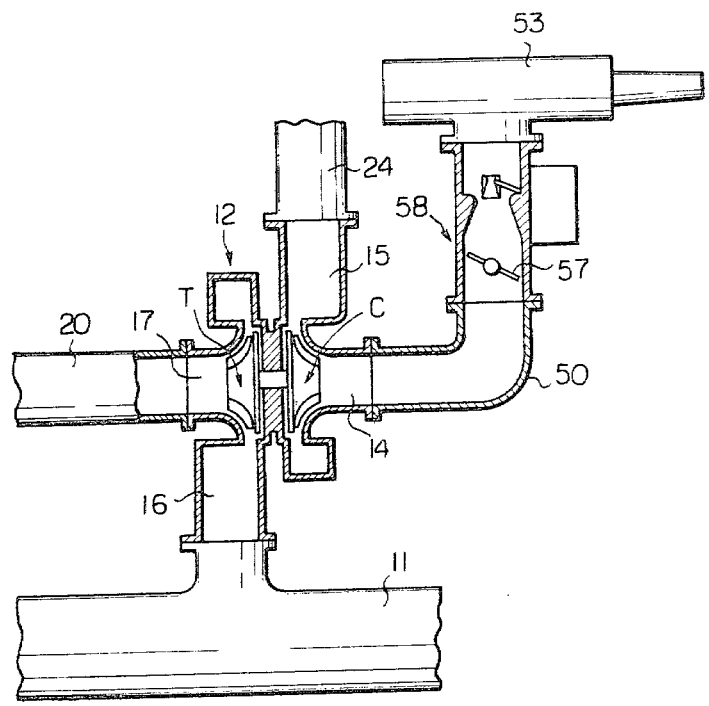
FIG. 8 is a cross-sectional side view of a further embodiment according to the present invention.

FIG. 8 illustrates a further embodiment according to the present invention. In FIG. 8, similar components are indicated with the same reference numerals used in FIGS. 5 through 7. Referring to FIG. 8, a carburetor 58 having a throttle valve 57 which is connected to the accelerator pedal (not shown) is mounted on the intake duct 50. In this embodiment, the vaporization of the mixture formed in the carburetor 58 is promoted when the mixture passes through the compressor C.

According to the present invention, in an internal combustion engine equipped with a turbocharger, the burning velocity can be greatly increased when the engine is operating under a light load and, in addition, knocking can be prevented from occurring when the engine is operating under a heavy load. Consequently, it is possible to always ensure a high output power of the engine.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine having a combustion chamber and an intake valve, said engine comprising:

a primary intake passage communicating the combustion chamber with the atmosphere;

an exhaust passage communicating the combustion chamber with the atmosphere;

a turbocharger comprising a compressor arranged in said intake passage, and a turbine arranged in said exhaust passage;

fuel supply means for forming an air-fuel mixture fed into the combustion chamber;

primary valve means arranged in said intake passage and opened in accordance with an increase in the level of the load of the engine;

secondary valve means arranged in said intake passage at a position located downstream of said primary valve means and said compressor;

an auxiliary intake passage having an inlet and an outlet which is connected to said intake passage located downstream of said secondary valve means, said inlet being connected to a portion of said intake passage which is located upstream of said secondary valve means and downstream of said primary valve means and said compressor; and means for actuating said secondary valve means in response to changes in pressure produced in the portion of said intake passage from vacuum to above atmospheric pressure, to gradually open said secondary valve means from a closed position to a full open position in accordance with an increase of the pressure from vacuum to atmospheric pressure and to gradually close said secondary valve means from the full open position to a partially open position in accordance with an increase of the pressure from atmospheric pressure to above atmospheric pressure, whereby the air passes through said auxiliary intake passage to the combustion chamber when the pressure of the portion of said intake passage is vacuum, the air passes through said primary intake passage thereto when the pressure of the portion of said intake passage is atmospheric pressure, and the air passes through both said auxiliary intake passage and said primary intake passage thereto when the pressure of the portion of said intake passage is above atmospheric pressure.

2. An internal combustion engine as claimed in claim 1, wherein said fuel supply means comprises a fuel injector arranged in said auxiliary intake passage.

3. An internal combustion engine as claimed in claim 1, wherein said fuel supply means comprises a fuel injector arranged in said intake passage.

4. An internal combustion engine as claimed in claim 3, wherein said fuel injector is arranged in said intake passage located upstream of said compressor.

5. An internal combustion engine as claimed in claim 4, wherein said fuel injector has a fuel nozzle directed to said primary valve means.

6. An internal combustion engine as claimed in claim 1, wherein said fuel supply means comprises a carburetor having said primary valve means and is arranged in said intake passage.

7. An internal combustion engine as claimed in claim 6, wherein said carburetor is arranged in said intake passage located upstream of said compressor.

8. An internal combustion engine as claimed in claim 1, wherein said primary valve means comprises a throttle valve arranged in said intake passage located upstream of said compressor.

9. An internal combustion engine as claimed in claim 1, wherein said primary valve means comprises a throttle valve arranged in said intake passage located downstream of said compressor.

10. An internal combustion engine as claimed in claim 1, wherein said auxiliary intake passage has a cross-sectional area which is smaller than that of said intake passage.

11. An internal combustion engine as claimed in claim 1, wherein the outlet of said auxiliary intake passage is arranged in the vicinity of said intake valve.

12. An internal combustion engine as claimed in claim 11, wherein the outlet of said auxiliary intake passage is directed to a valve gap formed between said intake valve and a valve seat thereof when said intake valve is opened.

13. An internal combustion engine as claimed in claim 12, wherein the outlet of said auxiliary intake passage is directed tangentially to a circumferential wall of said combustion chamber.

14. An internal combustion engine as claimed in claim 1, wherein said engine comprises at least two combustion chambers, said intake passage comprises an inlet passage portion having therein said compressor, and at least two outlet passage portions branched off from said inlet passage portion, each of said outlet passage portions being connected to a respective combustion chamber, said secondary valve means comprising at least two throttle valves each being arranged in a respective outlet passage portion, said auxiliary intake passage comprising at least two branch passages each being connected to a respective outlet passage portion located downstream of said corresponding throttle valve.

15. An internal combustion engine as claimed in claim 14, wherein said auxiliary intake passage further comprises a substantially straightly extending distribution passage to which said branch passages are connected, said fuel supply means being arranged in said distribution passage.

16. An internal combustion engine as claimed in claim 15, wherein said fuel supply means comprises at least two fuel injectors each having a fuel nozzle directed to an inside of said corresponding branch passage.

17. An internal combustion engine as claimed in claim 1, wherein said actuating means comprises a diaphragm connected to said second valve means and defining a control pressure chamber connected to said portion of said intake passage, and a diaphragm control device arranged in said control pressure chamber and cooperating with said diaphragm for controlling the movement of said diaphragm in accordance with changes in pressure produced in said portion of said intake passage.

18. An internal combustion engine as claimed in claim 17, wherein said diaphragm control device comprises a stationary stop, a movable spring retainer engageable with said stop and said diaphragm, a first spring biasing said diaphragm towards the retainer, and a second spring biasing said retainer towards said stop, said diaphragm engaging with said retainer and moving towards said control pressure chamber together with said retainer against the spring force of said second spring when vacuum is produced in said control pressure chamber, said diaphragm disengaging from said retainer and moving away from said control pressure chamber against the spring of said first spring force when positive pressure is produced in said control pressure chamber.

\* \* \* \* \*